(12) United States Patent
Sawhill et al.

(10) Patent No.: US 7,582,007 B2
(45) Date of Patent: Sep. 1, 2009

(54) OPEN TOP MEAT SKINNING DEVICE

(75) Inventors: Matthew P. Sawhill, Des Moines, IA (US); Kenneth L. Lebsack, Ankeny, IA (US); Bryan D. Kanis, Altoona, IA (US); James L. Myers, Urbandale, IA (US); Matthew A. Bergman, Des Moines, IA (US)

(73) Assignee: Stork Townsend Inc., Des Moines, IA (US)

( * ) Notice: Subject to any disclaimer, the term of this patent is extended or adjusted under 35 U.S.C. 154(b) by 80 days.

(21) Appl. No.: 11/739,379

(22) Filed: Apr. 24, 2007

(65) Prior Publication Data

US 2007/0202788 A1   Aug. 30, 2007

Related U.S. Application Data

(62) Division of application No. 11/094,047, filed on Mar. 30, 2005, now Pat. No. 7,241,213.

(51) Int. Cl.
*A22C 17/00* (2006.01)

(52) U.S. Cl. ...................................... 452/127

(58) Field of Classification Search ........... 452/125, 452/127–129, 133; 409/294, 308, 311, 312, 409/231, 232–234; 407/30, 33, 46, 47, 66
See application file for complete search history.

(56) References Cited

U.S. PATENT DOCUMENTS

| | | | |
|---|---|---|---|
| 935,602 A | 9/1909 | Grub | |
| 1,124,981 A * | 1/1915 | Weaver | 279/75 |
| 2,429,382 A * | 10/1947 | Wilson | 408/189 |
| 2,770,974 A * | 11/1956 | Jacobs | 74/54 |
| 3,424,217 A | 1/1969 | Burch | |
| 3,521,507 A * | 7/1970 | Yogus et al. | 408/199 |
| 3,729,775 A | 5/1973 | McDonald | |
| 3,931,665 A | 1/1976 | Townsend | |
| 4,063,332 A | 12/1977 | McCullough | |
| 4,071,923 A | 2/1978 | Smith | |
| 4,215,450 A | 8/1980 | Poss | |
| 4,272,862 A | 6/1981 | Griffin et al. | |
| 4,451,953 A | 6/1984 | Lenning | |
| 4,466,344 A | 8/1984 | Schill | |
| 4,628,806 A | 12/1986 | Murphy | |
| 5,122,091 A | 6/1992 | Townsend | |
| 5,558,573 A | 9/1996 | Basile, II. et al. | |
| 5,766,066 A | 6/1998 | Ranniger | |
| 5,779,531 A | 7/1998 | Braeger et al. | |
| 5,813,904 A | 9/1998 | Aslanis et al. | |
| 6,357,346 B1 | 3/2002 | Townsend | |
| 6,375,398 B1 * | 4/2002 | Gaudreau et al. | 409/232 |

(Continued)

FOREIGN PATENT DOCUMENTS

EP     11327004     5/2001

(Continued)

*Primary Examiner*—Thomas Price

(57) ABSTRACT

A roller assembly for a meat skinning device having a frame, a drive shaft rotatably mounted to the frame and having a female groove, and an elongated roller having a male prong frictionally received within the female groove, a bearing housing secured to the drive shaft, and a seal mounted on the roller and separated from a food zone of the roller.

9 Claims, 5 Drawing Sheets

U.S. PATENT DOCUMENTS

| | | | |
|---|---|---|---|
| 6,913,429 B1 * | 7/2005 | Phillips et al. | 409/182 |
| 7,048,481 B2 * | 5/2006 | Sugata et al. | 409/136 |
| 7,281,331 B1 * | 10/2007 | Stutsman | 29/898.07 |
| 7,284,938 B1 * | 10/2007 | Miyazawa | 409/231 |
| 7,293,943 B1 * | 11/2007 | Matsumura et al. | 409/136 |
| 7,316,529 B2 * | 1/2008 | Phillips et al. | 409/182 |
| 7,331,742 B2 * | 2/2008 | Kikkawa et al. | 409/233 |

FOREIGN PATENT DOCUMENTS

| | | |
|---|---|---|
| FR | 2545554 | 11/1984 |
| GB | 822121 | 10/1959 |
| WO | PCT/AU92/00044 | 6/1992 |
| WO | WO 92/14066 | 8/1992 |
| WO | PCT/DE92/00532 | 1/1993 |
| WO | 97/09509 | 12/1997 |
| WO | WO 01/80688 A1 | 10/2002 |

* cited by examiner

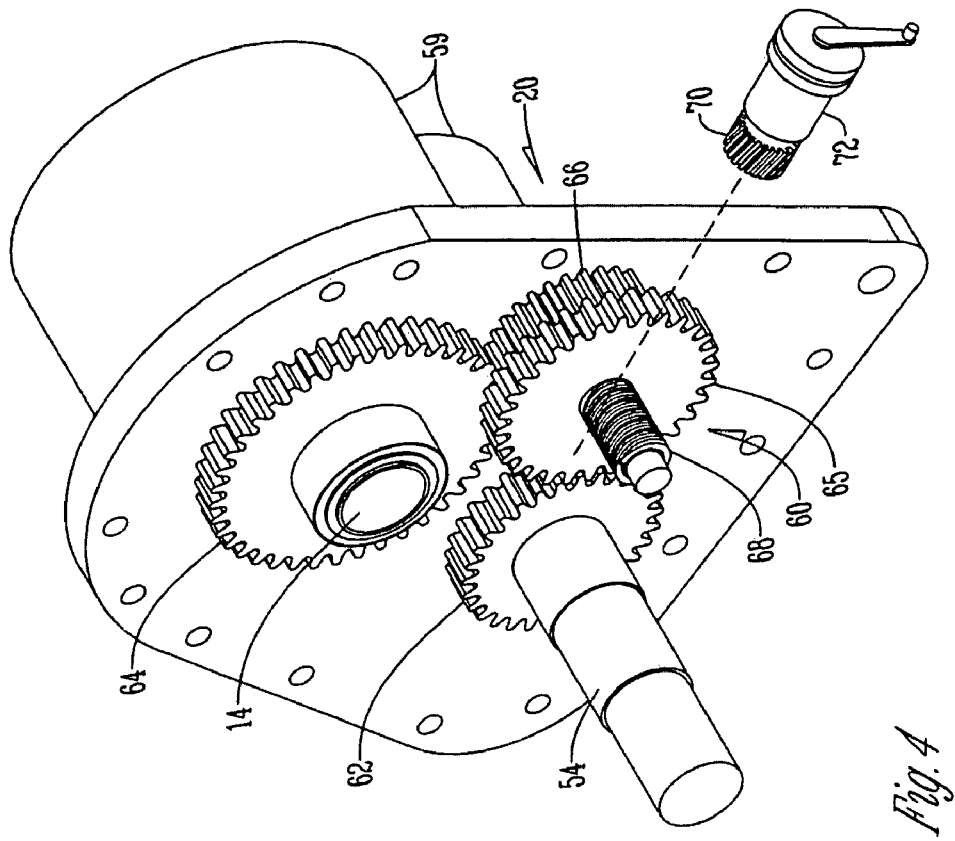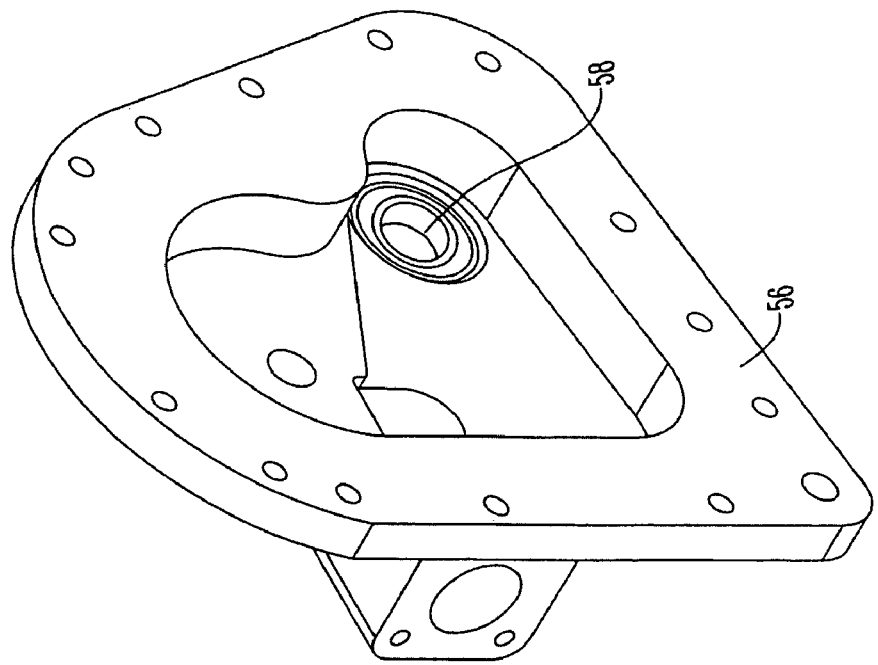
Fig. 4

OPEN TOP MEAT SKINNING DEVICE

CROSS REFERENCE TO A RELATED APPLICATION

This application is a division of U.S. Ser. No. 11/094,047 filed Mar. 30, 2005 now U.S. Pat. No. 7,241,213.

BACKGROUND OF THE INVENTION

The present invention relates to a meat skinning device and, more particularly, to an improved roller and gear box for a meat skinning device.

For many years, machines have been used to cut a layer of skin from a meat product. These machines typically have a plurality of rollers, including a stripper roll and a tooth roll, with a plurality of teeth positioned adjacent an elongated cutting blade. As the meat is moved toward the blade, the meat is gripped by the teeth on the rollers, which draw the meat product into contact with the blade. A layer of skin is cut away from the meat product and pulled between the rollers while the meat moves over the blade.

One disadvantage of conventional meat skinning devices is that the rollers often are difficult to remove. For cleaning and general maintenance, particularly when the teeth wear or degrade after prolonged use, the roller needs to be removed. Conventional rollers typically have an elongated shaft that extends into the bearings and drive mechanism. As such, one must completely disassemble the bearings and drive mechanism to remove the rollers. Thus, there is a need for a meat skinning device that provides for easier removal and installation of the rollers. In addition, conventional tooth rolls have a seal mounted on the end of the tooth roll to separate the working parts of the tooth roll assembly such as the bearings from the food zone. Because the seal is mounted directly to the tooth roll, occasional leakage of grease and lubricant from the bearing will contaminate the food, and when food particles leak into the bearing, the bearing operates inefficiently and its operational life is shortened. Thus, there is a need for an improved seal in the art.

Another disadvantage of conventional meat skinning devices is that the drive mechanism is a complicated system with many parts that is difficult to disassemble. Meat skinning devices typically use a drive shaft that extends below the skinning device and is operatively connected to the tooth roll through a drive pulley on one side of the skinning device, and operatively connected to the stripper roll through a drive pulley on the opposite side of the skinning device. As such, the assembly consumes a substantial amount of space and requires one to remove many of the components of the meat skinning device to gain access to the pulleys in order to repair or replace the drive mechanism. Accordingly, there is a need in the art for an improved means of driving the rollers.

Therefore, a principal object of this invention is to provide a meat skinning device that allows for the efficient removal or replacement of the rollers and drive mechanism.

A further object of this invention is to provide a roller for a meat skinning device whereby removal of the roller does not require the complete disassembly of the bearings and drive assembly.

Still a further object of this invention is to provide a centrally located drive mechanism for a meat skinning device that can be easily accessed and removed.

Another object of this invention is to provide a seal that reduces the possibility of leakage between the working parts and the tooth roll.

These and other objects will be apparent to those skilled in the art.

BRIEF SUMMARY OF THE INVENTION

The present invention is directed toward a meat skinning device having a roller assembly and a centralized gear box. The roller assembly has a male prong extending from an elongated roller that is frictionally received within a female groove on a drive shaft. The roller assembly is driven by a gear box having a housing, an opening in the housing through which the drive shaft extends, and a reduction gear assembly disposed within the housing and operatively connected to the rollers. The drive shaft is mounted within a bearing housing and a seal is positioned within the bearing housing such that the food zone of the roller is separated from the working parts of the drive mechanism.

BRIEF DESCRIPTION OF THE DRAWINGS

FIG. 4 is a perspective view of a gear box of the present invention; and

DESCRIPTION OF THE PREFERRED EMBODIMENTS OF THE INVENTION

Figure 1:
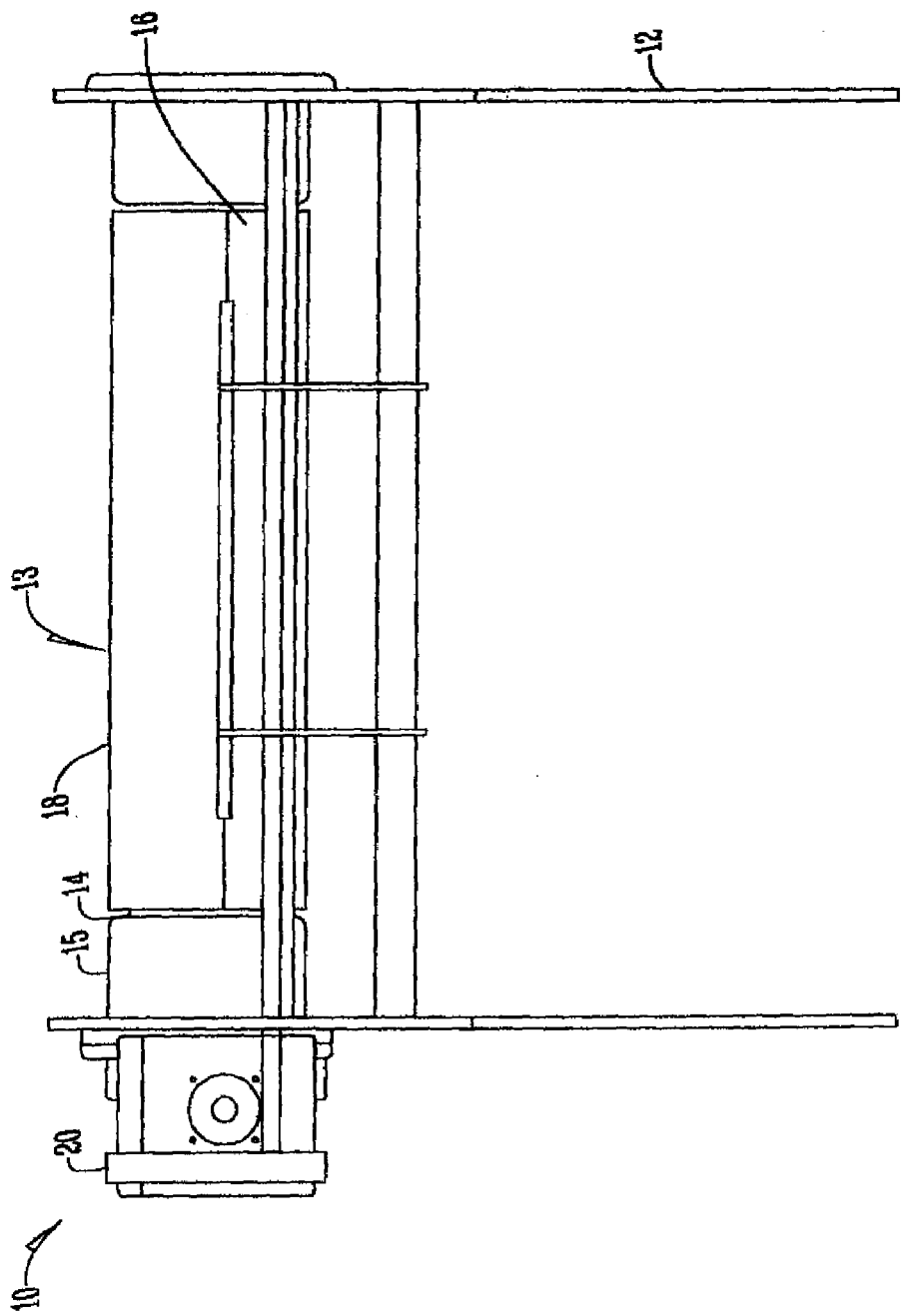
FIG. 1 is a side view of the present invention.

With reference to FIG. 1, an open top meat skinning device 10 is shown having a frame 12. The meat skinning device has a roller 13 engaged with a drive shaft 14 that is rotatably mounted within a bearing housing 15 of a drive mechanism such as gearbox 20. A stripper roll 16 and a tooth roll 18 are operatively connected to the drive shaft 14 and the roller assembly 13 is operatively connected to a gear box 20.

Figure 2:
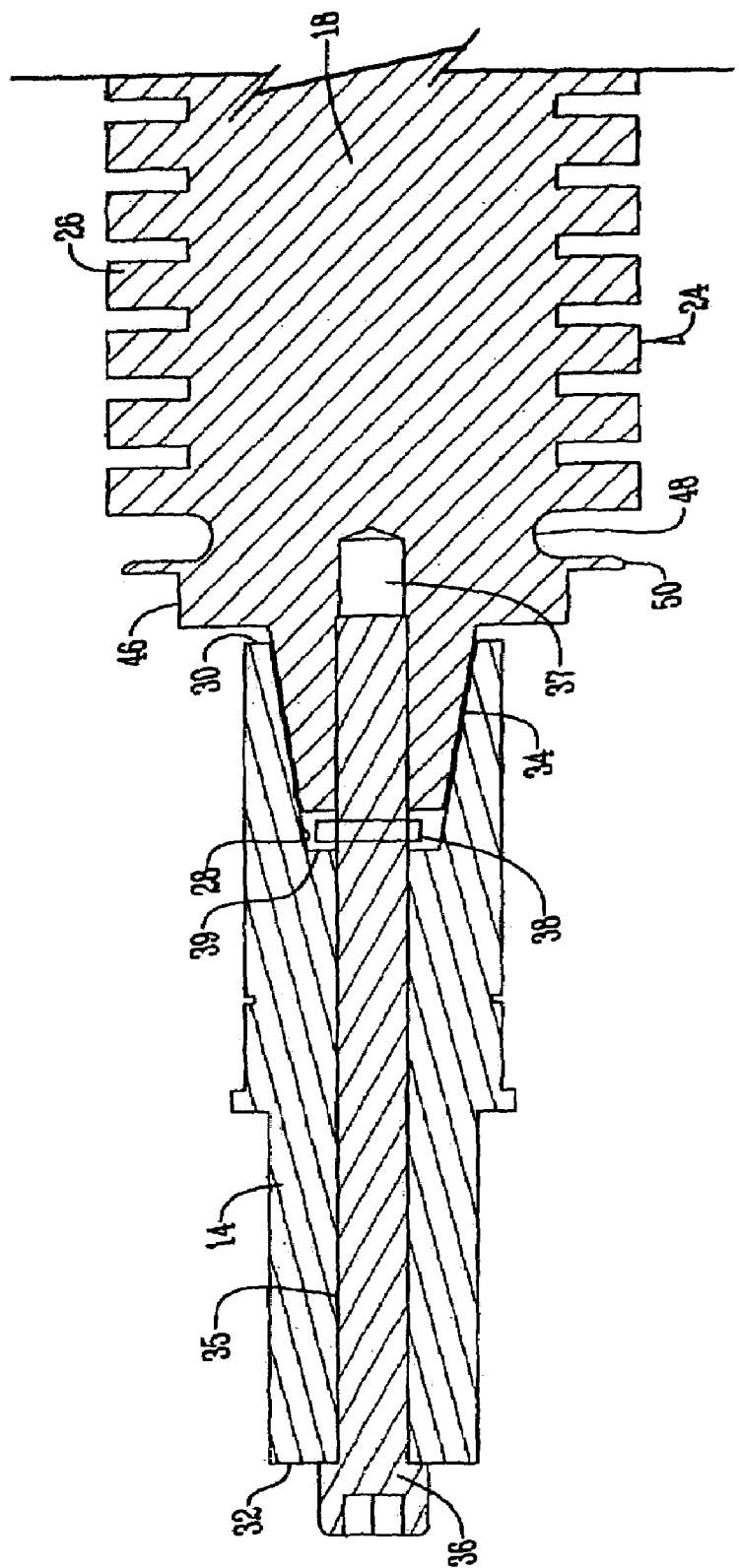
FIG. 2 is a sectional view of a roller of the present invention showing the tapered end connection.

The stripper roll 16 and tooth roll 18 are well known in the art for use with skinning machines. As shown in FIG. 2, the tooth roll 18 has a gripping portion 24 having a plurality of teeth 26, however any conventional tooth roll or stripper roll may be adapted for use with this invention.

The drive shaft 14 has a female groove 28 disposed within end 30. The opposite end 32 is received within gear box 20. The tooth roll 18 and stripper roll 16 have a male prong 34 that is frictionally received within the female groove 28. The female groove 28 and male prong 34 can be of any shape, but preferred is that the female groove 28 tapers inwardly from end 30 and prong 34 is tapered outwardly from its end toward the gripping portion 24. This configuration allows the tooth roll 18 and stripper roll 16 to be more precisely centered and aligned, eliminating the need for eccentrics in the bearings for adjusting the rollers.

The drive shaft 14 has a bore 35 that extends therethrough. Received within the bore 35 is a bolt 36 that extends through and out of the bore 35 and is threadably received by bore 37 disposed within the male prong 34 of the tooth roll 18 or stripper roll 16. In one embodiment, a retention device such as a snap ring 38 is mounted on the bolt 36 between the base 39 of the female groove 28 of the drive shaft 14 and the male prong 34 of the roller 16, 18. As the bolt is rotated to withdraw from the threaded bore 37, the snap ring 38 draws against the base 39 of the female groove 28, to push the male prong 34 outwardly to disengage the rollers 16, 18 from the drive shaft 14.

Figure 3:
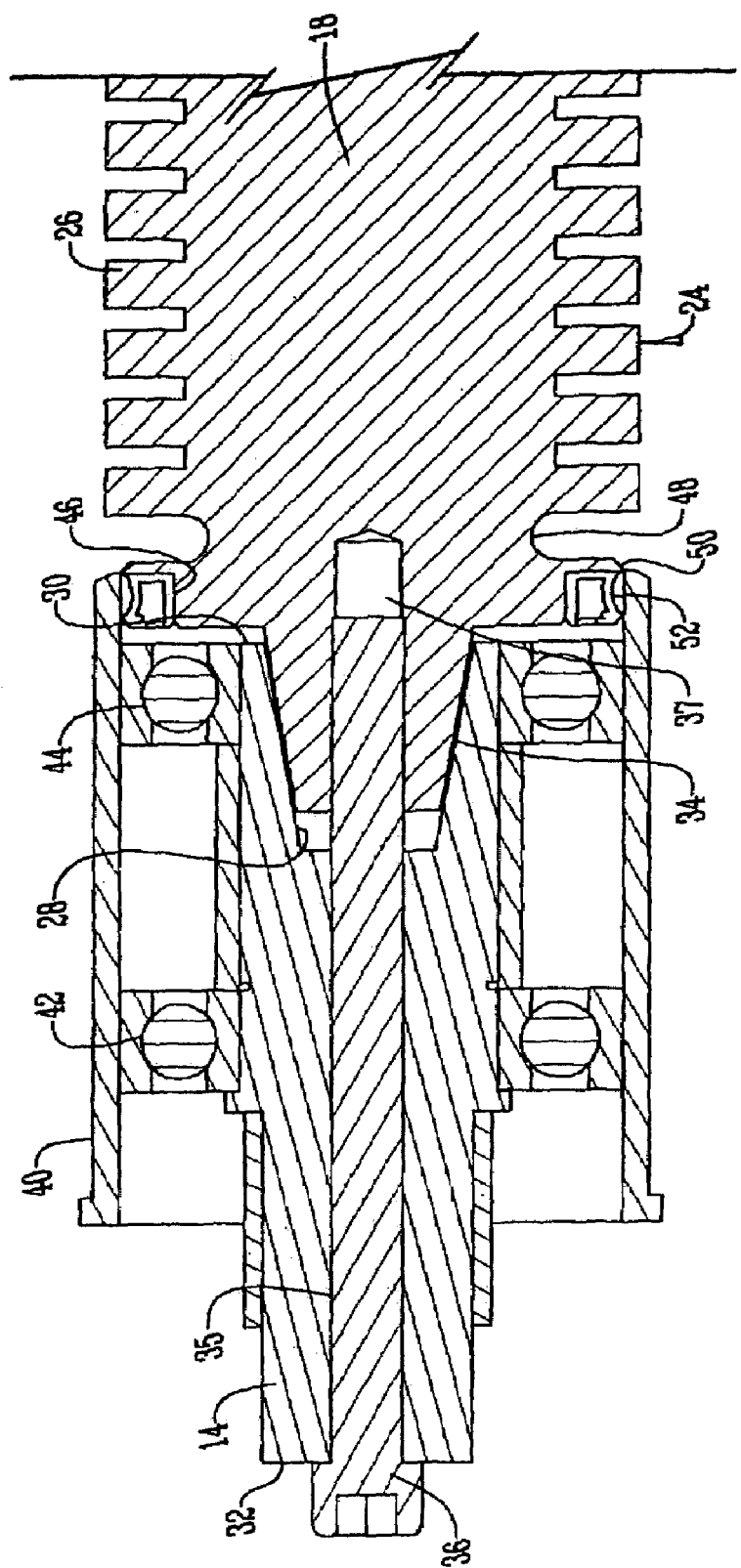
FIG. 3 is a sectional view of a roller of the present invention showing the clean out groove and seal.

A bearing housing 40, which contains bearings 42 and 44, rotatably secures the rollers 16 and 18, as shown in FIG. 3. Specifically, bearings 42 and 44 support the drive shaft 14, and bearing housing 40 encloses the bearings and extends over a portion of rollers 16 and 18.

The rollers 16 and 18 have an end 46 wherein a groove 48 is formed between the gripping portion 24 and a shoulder 50. The shoulder 50 is positioned adjacent to the end of the bearing housing 40. Mounted within the bearing housing 40 on end 46 of the rollers 16 and 18 is a seal 52. The seal 52 is positioned to reduce leakage from the bearings 42 and 44 to the food zone between the bearing housing 40 and shoulder 50. The seal 52 also, in conjunction with groove 48, prevents food particles from entering the bearing housing 40 thus reducing wear on bearings 42 and 44. The groove 48 receives food particles which causes the food particles to fall into the groove 48 and away from the seal 52. While a number of seals can be used, preferred is a double lip seal having two points of contact with the bearing housing 40.

Figure 5:
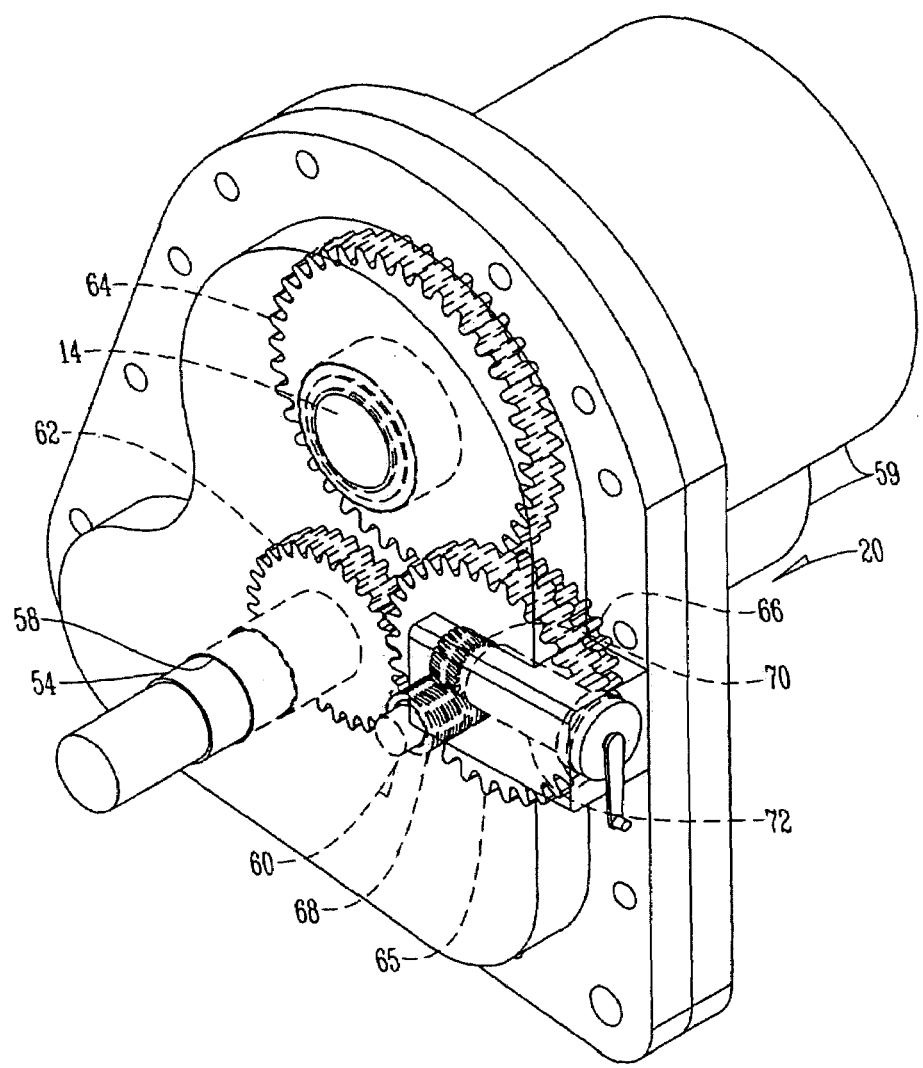
FIG. 5 is a perspective view of a gear box of the present invention.

Gear box 20 operatively connects drive shaft 54 to rollers 16 and 18, as shown in FIGS. 4-5. Gear box 20 has a housing 56 with an opening 58 adapted to receive the drive shaft 54, which engages directly with stripper roll 16. The housing has second openings 59 for receiving the rollers 16 and 18. A reduction gear assembly 60 is disposed within the housing 56 and is operatively connected to rollers 16 and 18. Specifically, the reduction gear assembly 60 has a first gear 62 mounted on the drive shaft 54, a second gear 64 operatively mounted to the drive shaft 14 of the tooth roller 18, and reduction gears 65 and 66 mounted on countershaft 67 that are operatively connected to the first gear 62 and the second gear 64. The gears 62, 64, 66 of the reduction gear assembly 60 are sized to control the rotational speed of the tooth roll 18 based on the rotational speed of the drive shaft 54 and stripper roll 16. Because the reduction gear assembly 60 is fully contained within housing 56, the gear box 20 is easily detachable from the frame 12 for replacement or repair.

In one embodiment, worm gear shaft 68 is operatively connected to the counter shaft 67, as shown in FIG. 4. Specifically, the reduction gear assembly 60 drives worm gear shaft 68 which in turn drives worm gear 70. Worm gear 70 is connected to a crank shaft 72, as shown in FIGS. 1 and 4, which is connected to a reciprocating air manifold 74. While an air manifold is preferred, other types of manifolds such as water mechanical, and the like may be used. Air manifold 74 directs one or more streams of air onto the rollers 16 and 18, which prevents residual meat from building up on the teeth 26 of the rollers. The rotation of worm gear 70 causes the crank shaft 72 and air manifold 74 to oscillate back and forth. In this manner, the air manifold 74 moves back and forth with respect to the rollers 16 and 18, thereby allowing the stream of air to be directed to a greater portion of the rollers.

In operation, the meat skinning device 10 operates by rotating drive shaft 54, which drives stripper roll 16. Reduction gear assembly 60, which is disposed within the housing 56 of gear box 20, is connected to stripper roll 16 such that the stripper roll 16 operatively drives the reduction gear assembly, which in turn rotates the tooth roller 18. Additionally, reduction gear assembly 60 is operatively connected to worm gear shaft 68, which drives worm gear 70 to cause crank shaft 72 and air manifold 74 connected thereto to oscillate slightly back and forth. Air manifold 74 directs a stream of air onto rollers 16 and 18, and the reciprocating movement of the air manifold 74 allows the stream of air to cover a greater portion of rollers 16 and 18. In this arrangement, gear box 20 may be easily removed from frame 12, which allows an operator to access the reduction gear assembly 60 without having to disassemble the meat skinning device 10.

Rollers 16 and 18 are installed such that they engage the drive shaft 14 in the gear box 20. Once installed, the rollers 16 and 18 can be easily removed without having to disassemble the meat skinning device 10 or gear box 20. Specifically, bolt 36 is removed such that the rollers 16 and 18 can be separated from the drive shaft 14 for cleaning, service, or replacement. The rollers 16 and 18 are re-installed by inserting the male prong 34 of the rollers 16 and 18 into the female groove 28 of the drive shaft 14. Bolt 36 is fastened such that the drive shaft 14 and rollers 16 and 18 rotate together.

While operating the meat skinning device 10, the roller teeth 26 trap and catch residual meat. The rotation of the rollers 16 and 18 causes some of the residual meat to move toward groove 48, which assists in preventing the meat from entering the bearing housing. The seal 52, which is separated from the food zone by shoulder 50, prevents the meat from leaking into the bearings 42 and 44 and vice versa. In this manner, residual meat is kept in the food zone and prevented from contacting the seal 52 and bearing housing 40 and lubricants are prevented from entering the food zone.

It is therefore seen that the present invention accomplishes at least all of the stated objectives.

What is claimed is:

1. A gear box for use with a meat skinning device comprising:
 a housing;
 an opening in the housing adapted to receive a drive shaft;
 a stripper roll operatively connected to the drive shaft;
 a reduction gear assembly disposed within the housing and operatively connected to the stripper roll and a tooth roll.

2. The device of claim 1 further comprising a worm gear operatively connected to the reduction gear assembly for driving a reciprocating manifold.

3. The device of claim 2 wherein the worm gear is driven by a worm gear shaft connected to the reduction gear assembly.

4. The device of claim 2 wherein the worm gear drives a crank shaft connected to the reciprocating manifold.

5. The device of claim 1 wherein the reduction gear assembly has a first gear mounted to the stripper roll, a second gear mounted to the tooth roll, and reduction gears operatively mounted to the first and the second gears.

6. The device of claim 5 wherein the stripper roll has a male prong frictionally received within the female groove of a drive shaft.

7. The device of claim 5 wherein the tooth roll has a male prong frictionally received within the female groove of a drive shaft.

8. The device of claim 1 wherein a seal is mounted on the stripper roll and separated from a food zone of the roll.

9. The device of claim 1 wherein a seal is mounted on the tooth roll and separated from a food zone of the roll.

* * * * *